Figure 4:
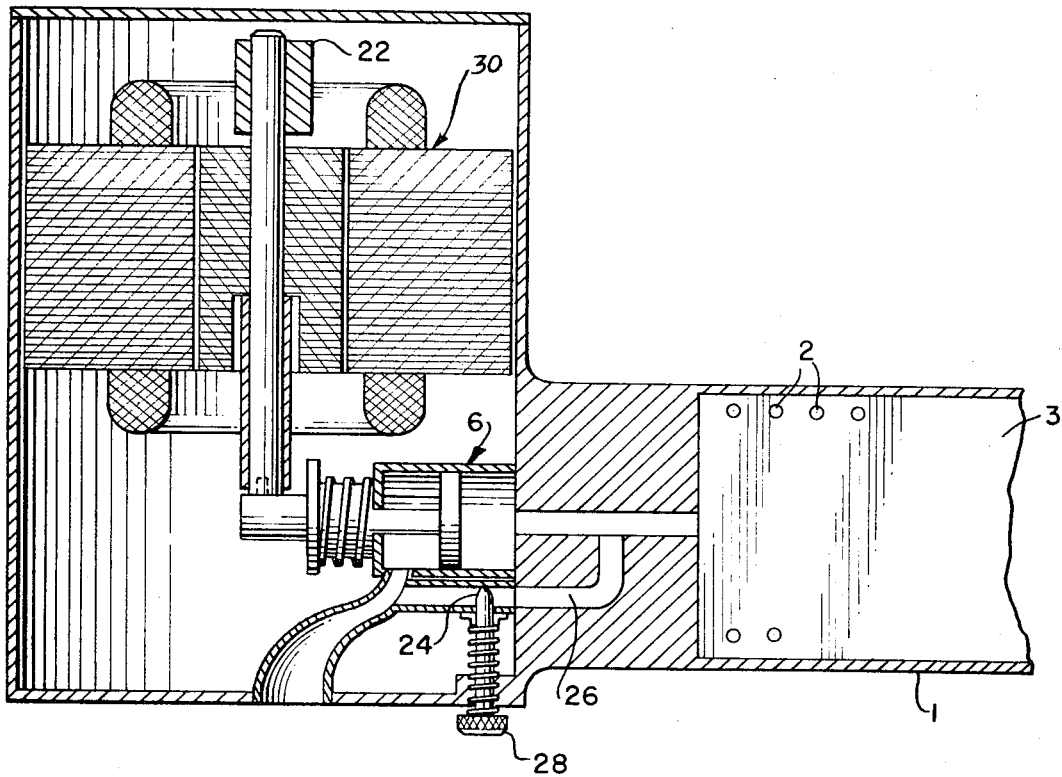

United States Patent
Allinquant et al.

[15] 3,661,072
[45] May 9, 1972

[54] APPLIANCE FOR THE PREPARATION OF BUTCHER'S MEAT BEFORE CONSUMPTION

[72] Inventors: Fernand Michel Allinquant; Jacques Gabriel Allinquant, both of 53 Avenue Le Notre, Sceaux 92, France

[22] Filed: Feb. 13, 1970

[21] Appl. No.: 11,145

[30] Foreign Application Priority Data

Feb. 14, 1969 France..................................6903739

[52] U.S. Cl. ...........................................................99/256
[51] Int. Cl. ..........................................................A23l 3/34
[58] Field of Search......................99/256, 257, 254, 255, 240

[56] References Cited

UNITED STATES PATENTS

| | | | |
|---|---|---|---|
| 2,656,785 | 10/1953 | Gannon | 99/257 |
| 2,796,017 | 6/1957 | Schmidt | 99/256 |
| 3,080,809 | 3/1963 | Harris | 99/257 |

*Primary Examiner*—Robert W. Jenkins
*Attorney*—William J. Daniel

[57] ABSTRACT

An appliance for the preparation of butcher's meat before consumption comprises the combination of a holder, a plurality of hollow needles arranged in parallel and protruding beneath the holder, a reservoir for a substance which is to be injected into the meat, such reservoir being in communication with the inside of the needles, and means to place the reservoir under pressure. The holder for the needles may be hollow and form the reservoir for the substance which is to be injected and the means for pressurizing the reservoir may comprise a pump delivering atmospheric air into the reservoir.

3 Claims, 4 Drawing Figures

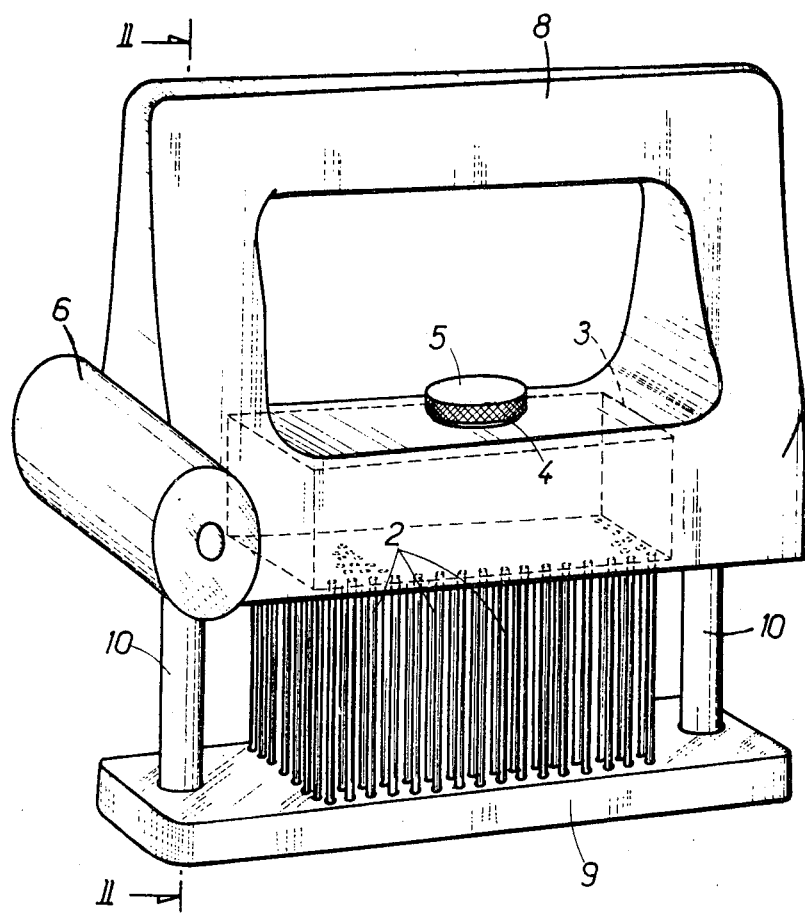
FIG.: 1

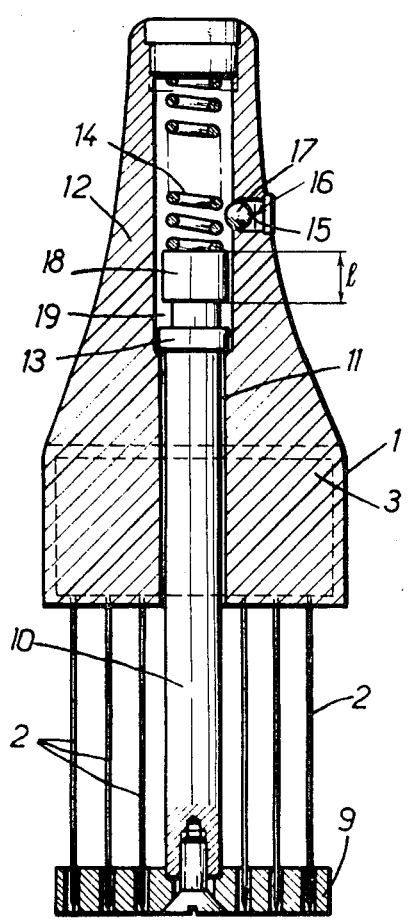
FIG.:2
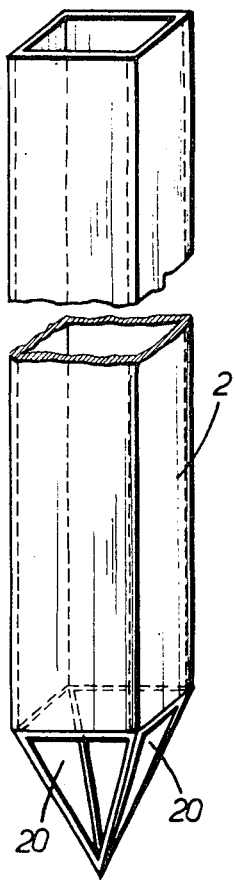
FIG.:3

APPLIANCE FOR THE PREPARATION OF BUTCHER'S MEAT BEFORE CONSUMPTION

BACKGROUND OF THE INVENTION

In order to tenderize butcher's meat before it is to be consumed, use is made of mallets for beating purposes, or of instruments which comprise points or multiple blades which are forced into the piece of meat. By this means a shearing effect is achieved on the long fibers of the tissues without otherwise modifying the state of the latter.

On the other hand, the most commonly employed culinary procedures, such as grilling or broiling, generally only involve the outside portion of the piece of meat.

SUMMARY OF THE INVENTION

The appliance of this invention serves for the preparation of meat before consumption and makes it possible, in a single operation, to simultaneously tenderize it and give it a treatment which will facilitate its cooking and/or its culinary dressing down to the very center of the meat. The appliance comprises the combination of a battery of hollow needles arranged beneath a holder and of sufficient length to penetrate to the center of a piece of meat placed beneath the holder, a reservoir or container for a culinary substance to be injected into the meat and pressure-exerting means to force such substance from the reservoir through the needles.

One embodiment of the invention will now be described, by way of example, with reference to the accompanying drawing, in which:

FIG. 1 is a perspective view of one construction of domestic appliance according to the invention, FIG. 2 is a section through the appliance taken along the line II—II of FIG. 1, FIG. 3 illustrates, on a larger scale and in perspective, one construction of a needle, and FIG. 4 is a partial horizontal cross-section of the left end of the appliance shown in FIG. 1 and revealing the arrangement of the vibrator and air pump used in conjunction with that appliance as well as the electric motor for actuating both the vibrator and pump.

DESCRIPTION OF THE INVENTION

Referring to the drawing, the embodiment of the invention which is illustrated therein by way of example is in the form of a portable household appliance capable of being easily operated by hand. It includes a frame 1 which is of any suitable material, for example metal or plastics, and the flat lower surface of which is of substantially rectangular shape and carries a considerable number of vertically disposed hollow needles 2, the latter being arranged closely together and in rows so that their points fall within a rectangle inside which they are distributed at regular intervals.

The frame 1 is hollow, so as to constitute a reservoir or container on to the bottom of which the channels extending through the needles 2 open and the reservoir may be filled with a liquid or viscous substance through a filling orifice 4 provided with a stopper 5. In FIG. 2 this reservoir, which is to the rear of the plane of the section, is indicated by broken lines at 3. It is similarly depicted in FIG. 1.

As will be seen from FIGS. 1 and 4, the frame 1 also carries a small pump 6 (shown generally in FIG. 1 and in detail in FIG. 4) which is intended to deliver substance under pressure from the reservoir 3 along the channels inside the needles 2. This pump may be an air pump, taking in atmospheric air and delivering it under pressure to the space above the level of the substance in the reservoir 3. An electric motor indicated at 30 in FIG. 4 may be provided to drive the pump.

It will be seen that if the battery or block of needles is forced into the piece of meat the latter can be tenderized through the tissues and fibers undergoing perforation. Furthermore, if the pump is started up when the needles have commenced their forced passage through the meat, penetration by the needles is accompanied by an injection of the chosen substance into the mass of the meat which may thus receive a dressing reaching to its center. The substance may be, for example, a rich edible substance, such as an oil, butter, fat, margarine, etc., or alternatively a culinary preparation, such as a sauce, an aromatic or the like, or finally a cooking enzyme which will effect modification of the tissues so as to tenderize them more completely.

The frame 1 is illustrated as having a handle 8 which makes it possible to grasp it in the hand and manipulate it appropriately, the appliance being approximately the size of a smoothing-iron.

A small electric switch may be arranged on the frame or on the handle of the appliance so that it can be actuated when desired by a finger of the hand grasping the handle in order to start up the electric motor and the injection pump.

In the embodiment illustrated in the drawing there is also depicted a protective grille 9 into which the points of the needles fit when the appliance is in the position of rest. Thus, the points are thereby shielded so that damage and/or injury is avoided when the appliance is transferred from one place to another.

The grille is carried by two small pillars 10 which are slidably arranged inside laterally extending bores 11 formed in the uprights 12 of the handle. These pillars are formed with abutments 13 and are subject to the action of return springs 14 which act to keep the abutments 13 against seatings provided by the body of the uprights, and the grille 9 in such a position that the points of the needles 2 will not protrude therefrom.

When the appliance is placed on a piece of meat so as to prepare the latter for cooking, contact is made through the intermediary of the grille 9. The latter thus remains motionless when pressure is applied downwards on the handle 8, while the needles which start to protrude below the grille 9 are able to penetrate into the meat.

With an embodiment of the invention such as described the relative movement of the grille and the frame may operate to automatically control the switch that starts up the pump. For example, the switch shown diagrammatically in FIG. 2 by a movable contact 15 and a fixed contact 16 may be controlled by a ball 17 which protrudes inwardly into a part of the bore of one of the uprights that is swept by a plunger or head 18 disposed above the corresponding abutment 13. The plunger 18 will be made of a sufficient length $l$, while allowing for the average thickness of a piece of meat, for the switch to remain closed during the time that a proportion of said thickness is traversed, and for it to open before the complete piercing of the meat by the needles. This result may be achieved by the provision of a neck 19 between the plunger 18 and abutment 13.

The needles may be of any suitable cross-section such as round, square or flattened.

In FIG. 3 a needle of square cross-section is illustrated, this shape proving preferable from the dual points of view of good resistance to buckling and the provision of a channel of relatively large cross-section for the passage of the chosen substance.

It will also be seen that with this shape it is easy to provide immediately behind the point of the needle an oblique arrangement of the orifice or orifices 20 through which the substance is ejected. This arrangement assists in preventing the penetration of solid debris into the channels of the needles, and their consequent clogging.

It will be appreciated that, by reason of the fact that the cross-section of the needles is larger than that of the solid blades of conventional applicances, which merely slice in tenderizing the meat, the force required to effect penetration by the block or needles may be greater. In order to facilitate the penetration and reduce the force required, in accordance with another feature of the invention it is possible to mount a generator on the frame of the appliance to set up high-frequency vibrations. This generator may be designed to be out of balance as indicated by the eccentrically mounted weight 22 in FIG. 4, and may be driven by the electric motor which operates the pump.

In the foregoing case the motor should be started up before the appliance is placed on the piece of meat requiring treatment. To prevent the substance from being ejected prematurely from the needles the pump may be linked with the motor by gearing, or alternatively may be fitted with a valve 24 which normally recirculates its output to the inlet through a by-pass conduit 26. Closing of the valve 24 to effect ejection of the chosen substance can be effected by a knob 28 located on the frame of the appliance or, as has been described above, by the relative movement of the grille relatively to the frame.

The appliance may be completed by electrical heating resistances arranged in the reservoir or in the wall of the latter, so as to melt substances such as butter or fats and maintain them in a liquid state.

Moreover the appliance described above in the form of a household utensil may also be constructed as an industrial machine having a larger number of needles and a device of the press type for shifting the block of needles, the mechanism being actuated by manual control or by an electric motor.

Instead of employing only hollow needles it is also possible to interpose solid blades of the simple cutting type at intervals in order to tenderize the meat by slicing through the fibers.

We claim:

1. An appliance for the preparation of butcher's meat before consumption comprising the combination of a holder, a reservoir housed within said holder and designed to contain a substance to be injected into the meat, a plurality of hollow needles protruding in parallel from said holder and communicating with said reservoir, a pump secured to said holder and discharging air into said reservoir, and an electric motor for actuating said pump.

2. An appliance as claimed in claim 1, further comprising a protective grid shielding said needles, means for supporting said grid on said holder while allowing movement of said grid relative to said needles to expose the latter, spring means for urging said grid into a needle shielding position, and a switch for controlling said electric motor, this switch being responsive to movement of said grid exposing said needles.

3. An appliance according to claim 1, comprising a vibrator having an unbalanced weight, said weight being mechanically driven by the electric motor which actuates the pump.

* * * * *